(12) United States Patent
Chi et al.

(10) Patent No.: US 10,639,789 B2
(45) Date of Patent: May 5, 2020

(54) ELECTRONIC DEVICE HAVING MULTIPLE MOTORS IN SERIES CONNECTION, AND MOTOR NUMBER SETTING METHOD FOR THE SAME

(71) Applicant: New Era AI Robotic Inc., Taipei (TW)

(72) Inventors: Shou-Wei Chi, Taipei (TW); Ting-Shuo Chen, Taipei (TW)

(73) Assignee: NEW ERA AI ROBOTIC INC., Taipei (TW)

( * ) Notice: Subject to any disclaimer, the term of this patent is extended or adjusted under 35 U.S.C. 154(b) by 0 days.

(21) Appl. No.: 16/033,580

(22) Filed: Jul. 12, 2018

(65) Prior Publication Data
US 2019/0275670 A1    Sep. 12, 2019

(30) Foreign Application Priority Data
Mar. 6, 2018    (CN) .......................... 2018 1 0183048

(51) Int. Cl.
*G05B 15/02* (2006.01)
*B25J 9/12* (2006.01)
*G05B 19/042* (2006.01)

(52) U.S. Cl.
CPC ................ *B25J 9/12* (2013.01); *G05B 15/02* (2013.01); *G05B 19/0423* (2013.01);
(Continued)

(58) Field of Classification Search
CPC ................ G05B 19/0423; G05B 11/32; G05B 2219/21028
See application file for complete search history.

(56) References Cited

U.S. PATENT DOCUMENTS

| 2004/0250964 | A1* | 12/2004 | Carmen, Jr. | ............. E06B 9/68 160/120 |
| 2006/0117773 | A1* | 6/2006 | Street | ..................... F25B 49/02 62/213 |

(Continued)

FOREIGN PATENT DOCUMENTS

| CN | 102270958 A | 12/2011 |
| EP | 2770385 A1 | 8/2014 |

(Continued)

OTHER PUBLICATIONS

Search Report dated May 10, 2019 of the corresponding European patent application.

(Continued)

*Primary Examiner* — Rina I Duda
(74) *Attorney, Agent, or Firm* — Chun-Ming Shih; HDLS IPR Services

(57) ABSTRACT

A motor number setting method adopted by an electronic device including an MCU and multiple motors in series connection with a communication port of the MCU. When performing a setting procedure, the MCU obtains a motor amount of the multiple motors, and scans the communication port for obtaining a motor-number of each motor. Next, the MCU determines whether an amount of different motor-numbers equals the motor amount of the multiple motors. If the amount of different motor-numbers differs from the motor amount of the motors, the MCU sends a random numbering command to multiple motors having an identical motor-number so as to make these motors respectively performing a random numbering procedure for generating a new motor-number. Next, the MCU again scans the communication port until determining that the amount of the different motor-numbers equals the motor amount of the motors.

15 Claims, 9 Drawing Sheets

(52) U.S. Cl.
CPC .............. *G05B 2219/21049* (2013.01); *G05B 2219/33145* (2013.01); *G05B 2219/34245* (2013.01); *G05B 2219/45083* (2013.01)

(56) References Cited

U.S. PATENT DOCUMENTS

| | | | |
|---|---|---|---|
| 2007/0194728 A1 | 8/2007 | Beifus | |
| 2008/0177919 A1* | 7/2008 | Miyazawa | H04L 12/403 710/110 |
| 2009/0128080 A1* | 5/2009 | Cheng | G05B 19/0423 318/625 |
| 2009/0189550 A1* | 7/2009 | Sun | H02N 2/0075 318/51 |
| 2009/0248933 A1* | 10/2009 | Fukuda | H04L 1/188 710/110 |
| 2015/0355636 A1 | 12/2015 | Kataoka | |
| 2018/0052435 A1 | 2/2018 | Huang et al. | |

FOREIGN PATENT DOCUMENTS

| | | |
|---|---|---|
| EP | 3151415 A1 | 4/2017 |
| TW | 201427362 A | 7/2014 |
| TW | 201531053 A | 8/2015 |
| TW | I554022 B | 10/2016 |

OTHER PUBLICATIONS

Office Action dated Nov. 19, 2018 of the corresponding Taiwan patent application.

* cited by examiner

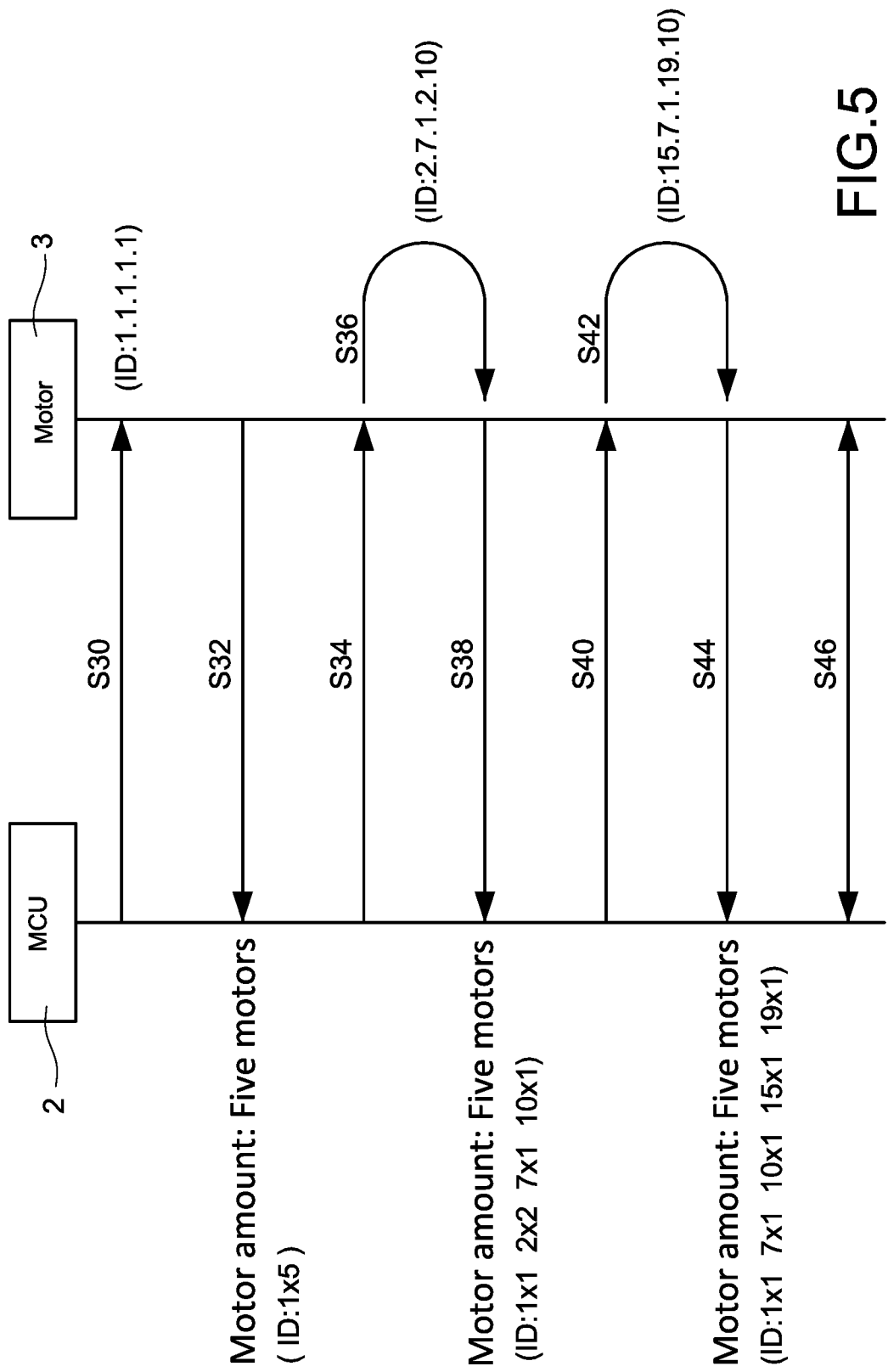

ELECTRONIC DEVICE HAVING MULTIPLE MOTORS IN SERIES CONNECTION, AND MOTOR NUMBER SETTING METHOD FOR THE SAME

BACKGROUND OF THE INVENTION

1. Technical Field

The technical field relates to an electronic device, and specifically relates to an electronic device having multiple motors in series connection, and a motor number setting method for the electronic device.

2. Description of Related Art

Electronic devices which have complicated structure (such as robots) may be embedded with multiple servo motors, therefore, a user of the electronic devices may control the electronic devices to perform numerous, specialized actions.

Generally speaking, the above servo motors inside the electronic devices may respectively have different motor number (for example, an electronic device may have ten servo motors which are numbered from number 1 to number 10). The electronic device may transmit different commands respectively to each corresponding servo motor for being executed according to their motor number, so as to accomplish one move (such as controlling a robot to walk) in company with these servo motors. In other words, if the motor numbers are incorrect, or more than one of the servo motors use same motor number, the electronic device will be in trouble of controlling failure.

In particular, some factories may set an accurate motor number for each servo motor (e.g., number 1 to number 10 for ten servo motors) during its producing procedure. However, the factories may cause an assembling mistake, for example, it may wrongly adopt two servo motors that have same motor number "1" and miss the servo motor having motor number "10". In this scenario, a well-assembled electronic device may cause the aforementioned trouble of controlling failure.

For another example, parts of the factories may omit the procedure for setting the motor numbers due to the purpose of cost reduction, and they may make all the servo motors to have same motor number (for example, set a default motor number "1" for all servo motors). In this embodiment, after purchasing this kind of servo motors for assembling the aforementioned electronic device by a user himself/herself, the user will face a problem that a well-assembled electronic device may not be able to control these servo motors correctly because commands can never be transmitted to corresponding servo motors.

SUMMARY OF THE INVENTION

The invention is directed to an electronic device having multiple motors in series connection, and a motor number setting method for the electronic device, which may allow the electronic device to reset motor numbers of the multiple motors inside the electronic device without dismounting the electronic device.

In one of the exemplary examples of the present invention, the above motor number setting method is adopted for an electronic device, the electronic device has an MCU and multiple motors in series connection with a communication port of the MCU, and the motor number setting method comprises following steps:

a) obtaining a motor amount of the multiple motors connected with the communication port by the MCU;
b) scanning the communication port by the MCU for respectively obtaining a motor number of each motor;
c) determining whether an amount of different motor numbers is equal to the motor amount by the MCU;
d) sending a random numbering command to a plurality of adjusting motors of the multiple motors that have an identical motor number by the MCU when determining that the amount of different motor numbers is different from the motor amount;
e) performing a random numbering procedure according to the random numbering command for generating a new motor number by each of the adjusting motors respectively; and
f) re-executing the step b) to the step e) before determining that the amount of different motor numbers is equal to the motor amount by the MCU.

In one of the exemplary examples of the present invention, the above electronic device comprises:
multiple motors, each of the motors respectively having a motor number;
an MCU, configured to record a motor amount of the multiple motors and connected with the multiple motors in series connection through a communication port, and configured to scan the communication port for obtaining the motor number of each motor;
wherein, the MCU is configured to determine whether an amount of different motor numbers is equal to the motor amount, and configured to send a random numbering command to a plurality of adjusting motors of the multiple motors that have an identical motor number when determining that the amount of different motor numbers is different from the motor amount;
wherein, each of the adjusting motors is respectively configured to perform a random numbering procedure for generating a new motor number according to the random numbering command;
wherein, the MCU is configured to re-scan the communication port and send the random numbering command before determining that the amount of different motor numbers is equal to the motor amount.

In comparison with related art, if multiple motors in series connection inside the electronic device have same motor number, the present invention allows a user to separate the motors having the same motor number directly without dismounting the electronic device and to reset the motor number of these motors, so as to achieve the purpose of correctly controlling all the motors inside the electronic device.

DESCRIPTION OF THE DRAWINGS

FIG. 5 is a time-sequence diagram according to the first embodiment of the present invention.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 1:
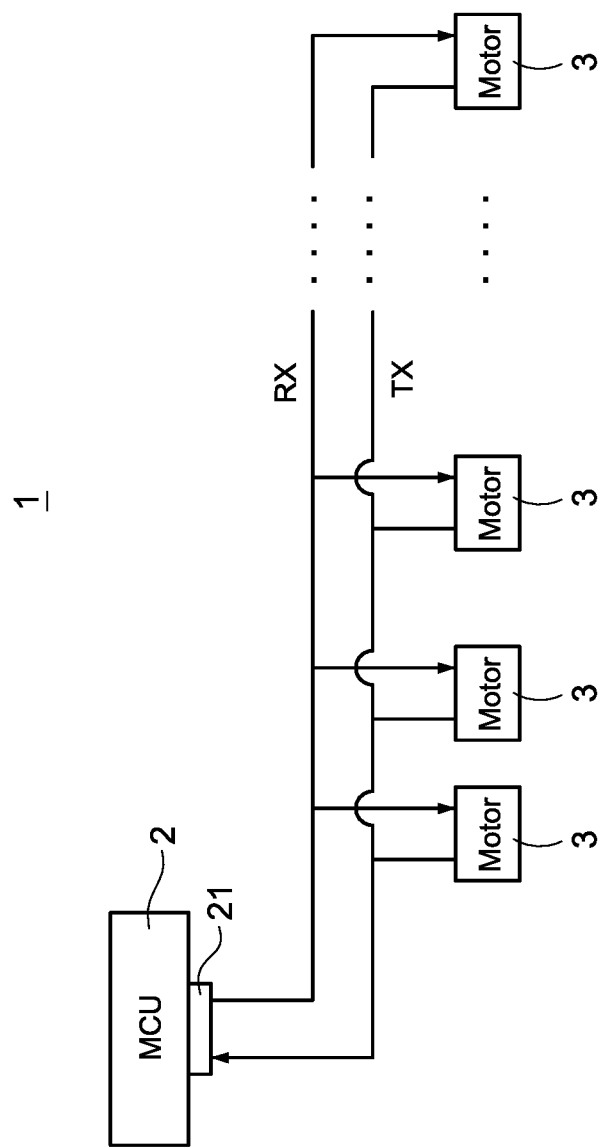
FIG. 1 is a schematic diagram showing motors in series connection according to a first embodiment of the present invention.

FIG. 1 is a schematic diagram showing motors in series connection according to a first embodiment of the present invention. The present invention discloses an electronic device having multiple motors in series connection (refers to as the electronic device 1 hereinafter), the electronic device 1 at least includes a micro control unit (MCU) 2 and multiple motors 3 in series connection with the MCU 2.

As shown in FIG. 1, the MCU 2 at least has one communication port 21, and the MCU 2 is in series connection with the multiple motors 3 inside the electronic device 1 through the communication port 21. In other embodiment, the MCU 2 may include multiple communication ports 21, and each communication port 21 may respectively in series connection with one or several motors, that is, the MCU 2 is not limited in the single communication port 21 as shown in FIG. 1.

One of the main objects of the present invention is to assist the user to reset the motor number of the multiple motors 3 without dismounting the electronic device 1 when parts or all of the multiple motors 3 in series connection with the communication port 21 are having same motor number.

For the sake of discussion, a MCU 2 having one single communication port 21 for being connected with the multiple motors 3 will be taken into an example in the following embodiments.

The multiple motors 3 inside the electronic device 1 respectively have one motor number. In an initial status, the motor number of the multiple motors 3 may be totally different, partially identical, or totally identical, not limited thereto. The MCU 2 is in series connection with the multiple motors 3 through the communication port 21, and the MCU 2 may scan the communication port 21 for obtaining the motor number of each of the multiple motors 3 connected with the communication port 21.

In one embodiment, the MCU 2 may initially record total amount of the multiple motors 3 in series connection with the communication port 21 (refers to as the motor amount hereinafter). In another embodiment, the user may manually input the above motor amount through a human-machine interface (not shown) when proceeding to adjust the motor number of the multiple motors 3. In the present invention, the MCU 2 first obtains the motor number of all the motors 3 upon the communication port 21, and then determines whether an amount of different motor numbers is equal to the motor amount. If the amount of different motor numbers does equal the motor amount, it indicates that the multiple motors connected thereto are all having different motor number, i.e., all the motor numbers are not identical to one another.

For an instance, if the communication port 21 is in series connection with four motors 3 that respectively labeled with motor numbers "1", "2", "3", and "4", because the amount of different motor numbers (there're four different motor numbers) equals the motor amount (there're four motors 3), the MCU 2 will determine that no motor number is reduplicated in the electronic device 1. Otherwise, if the four motors 3 connected with the communication port 21 are respectively labeled as "1", "1", "2", and "4", because the amount of different motor numbers (there're only three different motor numbers) is not equal to the motor amount (there're four motors 3), the MCU 2 will determine that there're at least two motors 3 in the electronic device 1 share an identical motor number.

In one embodiment, if the MCU 2 determines that the amount of different motor numbers is different from the motor amount, it may send a random numbering command respectively to a plurality of adjusting motors of the multiple motors 3. In this embodiment, the adjusting motors are parts of the multiple motors 3 in the electronic device 1 that have the identical motor number. The above random numbering command may be a command package that includes a head message, an ID message, a CMD message, and a DATA message, but not limited thereto.

In the embodiment, the multiple motors 3 of the electronic device 1 may be servo motors embedded with a microprocessor. After receiving the random numbering command, each adjusting motor of the multiple motors 3 may respectively perform a random numbering procedure by its microprocessor in accordance with the content of the received random numbering command, so as to generate a new motor number for the adjusting motor itself. Accordingly, when the MCU 2 again scans the communication port 21, the plurality of adjusting motors may respectively reply to the MCU 2 with their new motor number, so as to solve the problem of having the identical motor number.

As shown in FIG. 1, the communication port 21 may have a transmission signal line (Tx) and a receiving signal line (Rx). In the above embodiment, the MCU 2 is broadcasting a scanning signal externally through the receiving signal line for scanning the communication port 21. Each of the multiple motors 3 respectively receives the scanning signal sent from the MCU 2 through the receiving signal line, and then broadcasts externally its motor number through the transmission signal line. Also, each of the plurality of adjusting motors respectively receives the random numbering command sent from the MCU 2 through the receiving signal line, and then broadcasts externally its new motor number through the transmission signal line.

The above description is just one embodiment of the present invention, the MCU 2 may connect with the multiple motors 3 through multiple transmission signal lines and multiple receiving signal lines, not intended to limit the scope of the present invention due to the disclosure of FIG. 1.

Figure 2:
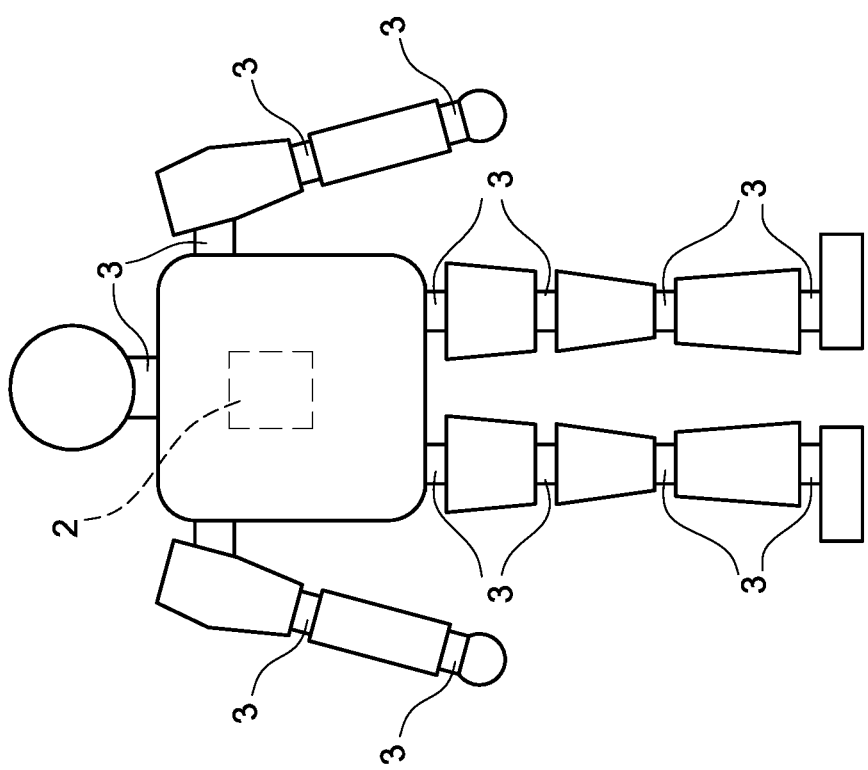
FIG. 2 is a schematic diagram showing an electronic device according to the first embodiment of the present invention.

FIG. 2 is a schematic diagram showing an electronic device according to the first embodiment of the present invention. In one embodiment, the electronic device 1 may be a robot, the multiple motors 3 may be servo motors that are embedded with a microprocessor and responsible of controlling joints of the robot. When the user performs an operation on the robot, the MCU 2 may send different commands to different motors 3 corresponding to different joints/positions of the robot for making each motor 3 to act, therefore, the whole robot may perform a corresponding action according to the operation of the user.

Figure 3:
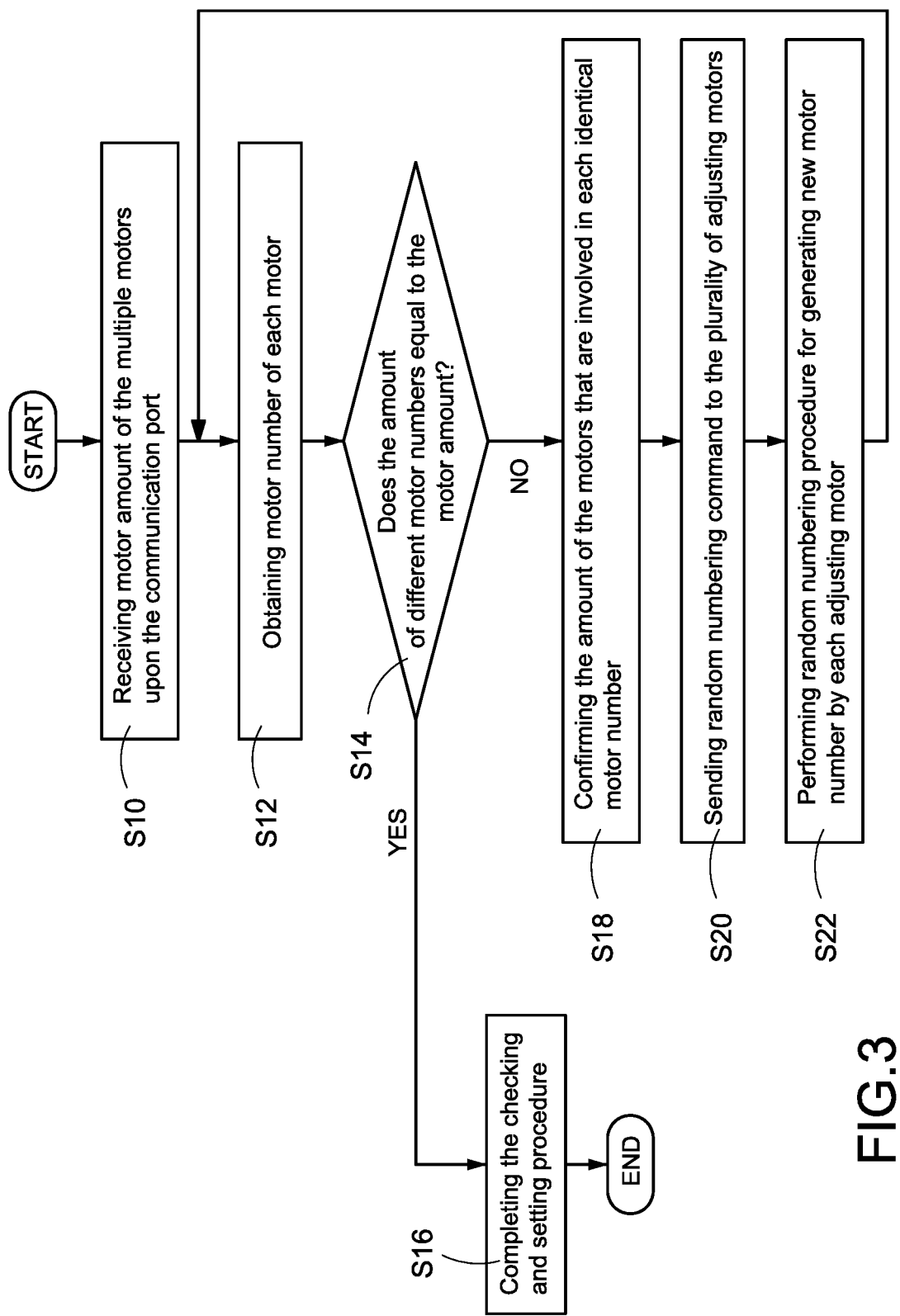
FIG. 3 is a flowchart for setting motor numbers according to the first embodiment of the present invention.

FIG. 3 is a flowchart for setting motor numbers according to the first embodiment of the present invention. The present invention further discloses a motor number setting method (refers to as the setting method hereinafter), the setting method is mainly adopted by the electronic device 1 as shown in FIG. 1 and FIG. 2. In particular, the setting method of the present invention is executed by the MCU 2 inside the electronic device 2, so as to check and set the motor number for the multiple motors 3 in series connection with the MCU 2.

As shown in FIG. 3, when performing a checking and setting procedure of motor numbers to the electronic device 1, a user first inputs a motor amount of the multiple motors 3 in series connection with the communication port 21 of the MCU 2 through a HMI (such as a keyboard, a mouse, a touch screen, a smart device, etc.) (step S10), and the MCU 2 may receive the motor amount through the HMI. In another embodiment, a manufacturer of the electronic device 1 may pre-store the motor amount in the MCU 2 (such as embedded the motor amount in firmware of the MCU 2) while the production of the electronic device 1, but not limited thereto.

Next, the MCU 2 may broadcast externally a scanning signal for scanning the communication port 21, so as to obtain the motor number of each motor 3 connected with the communication port 21 according to a scanning result (step S12). After obtaining the motor amount and the motor number of the multiple motors 3, the MCU 2 further determines whether an amount of different motor numbers equals the motor amount (step S14), i.e., the MCU 2 ensures that all of the motors 3 upon the communication port 21 are all having different motor number.

If the MCU 2 determines that the amount of different motor numbers is equal to the motor amount in the step S14, it indicates that the multiple motors 3 connected with the communication port 21 do not share an identical motor number, so the MCU 2 may complete the checking and setting procedure (step S16). It should be mentioned that if the MCU 2 has multiple communication ports 21, it may proceed to perform the checking and setting procedure for another motors 3 connected with the next communication port 21 after the step S16.

If the MCU 2 determines that the amount of different motor numbers is different from the motor amount, it indicates that at least two motors 3 upon the communication port 21 share an identical motor number. In this scenario, the plurality of motors 3 having the identical motor number may be regarded as the aforementioned adjusting motors by the MCU 2, and the MCU 2 may send a random numbering command to each of the adjusting motors for commanding each of the adjusting motors to generate the aforementioned new motor number.

In particular, when determining that the amount of different motor numbers is different from the motor amount (basically when the amount of different motor numbers is smaller than the motor amount), the MCU 2 first confirms an amount of the motors 3 that are involved in each identical motor number (step S18), and regards these motors having the identical motor number as the aforementioned adjusting motors. Next, the MCU 2 sends the random numbering command to the plurality of adjusting motors through the communication port 21 (step S20). In one embodiment, the MCU 2 may confirm the amount of the motors 3 that are involved in each identical motor number based on a return delay mechanism (i.e., the MCU 2 may record that how many times the same motor number has been replied), but not limited.

After the step S20, the plurality of adjusting motors of the multiple motors 3 may respectively receive the random numbering command sent from the MCU 2, thus, each of the adjusting motors may perform a random numbering procedure according to the content of the received random numbering command, so as to generate a new motor number (step S22). In particular, the adjusting motors in the present embodiment may be servo motors that have a microprocessor, and firmware of the microprocessor may be pre-embedded with programming code related to the above random numbering procedure. Therefore, each of the adjusting motors may respectively trigger its own microprocessor to perform the random numbering procedure for generating the new motor number after receiving the random numbering command.

In one embodiment, data of the random numbering command may include a numbering condition. After receiving the random numbering command, each of the adjusting motors may respectively perform the above random numbering procedure according to the data of the random numbering command for generating the new motor number which meets the requirement of the numbering condition. In this embodiment, the numbering condition may be set (e.g., by the MCU 2) within a number section that is not reserved for the electronic device 1. For example, if the electronic device 1 includes eighteen motors 3, the MCU 2 may set the above number section (i.e., the numbering condition) within 19~255. After performing the random numbering procedure according to the data of the random numbering command, each of the adjusting motors may respectively generate one new motor number that is within number 19 to number 255. Therefore, the present invention may increase the probability that obviates the motor number reduplication problem by only performing once of the checking and setting procedure.

In another embodiment, the microprocessor of each adjusting motor may first obtain parameters such as a serial number of the motor, an output of a timer, and an accumulated execution time, etc., and then performs the random numbering procedure according to at least one of the parameters. Because each of the multiple motors 3 does have different parameters, thus the probability of obviating the motor number reduplication problem by performing once of the checking and setting procedure may be greatly increased via adopting the aforementioned approach.

After the step S22, the MCU 2 goes back to the step S12 for again scanning the communication port 21, re-obtaining the motor number (including original motor number and new motor number) of all the motors 3 connected with the communication port 21, and again determining whether the amount of different motor numbers equals the motor amount. In the present invention, the MCU 2 and each of the motors 3 may continually execute the step S12, the step S14, the step S18, the step S20, and the step S22 of FIG. 3 until the amount of different motor numbers equals the motor amount.

FIG. 4A to FIG. 4D are schematic diagrams that respectively show a first setting action, a second setting action, a third setting action, and a fourth setting action according to the first embodiment of the present invention.

Figure 4A:
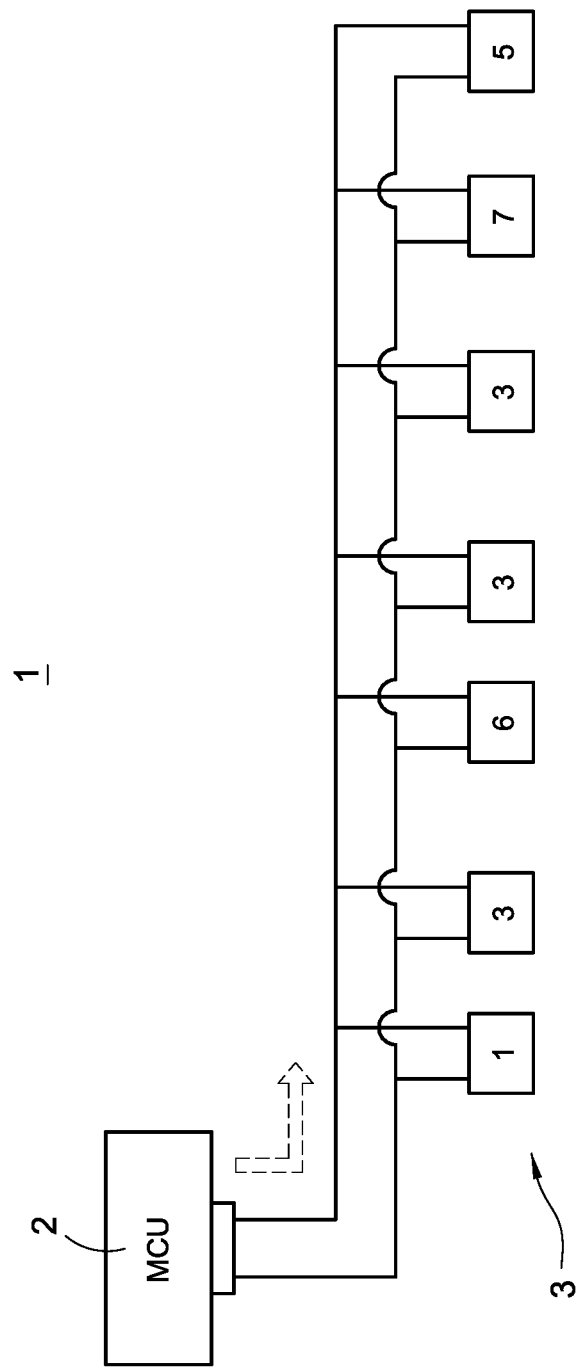
FIG. 4A is a schematic diagram showing a first setting action according to the first embodiment of the present invention.
Figure 4B:
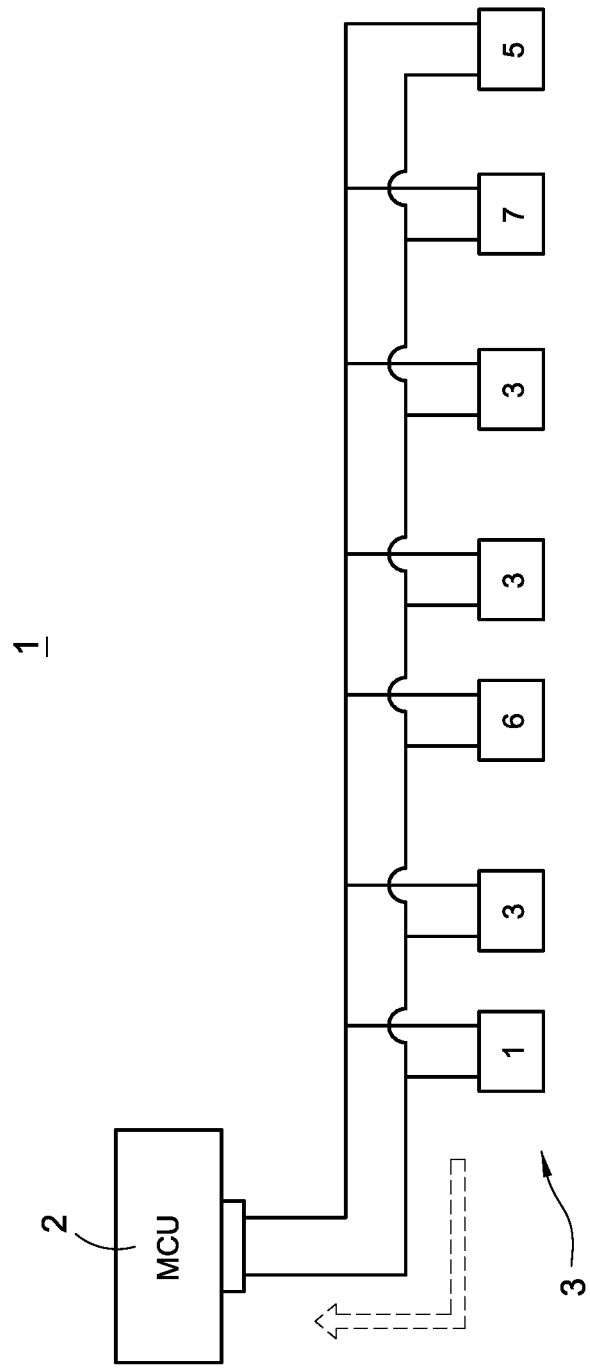
FIG. 4B is a schematic diagram showing a second setting action according to the first embodiment of the present invention.

As shown in FIG. 4A and FIG. 4B, the MCU 2 scans the communication port 21 through broadcasting the scanning signal on the receiving signal line, and obtains the motor numbers respectively replied from the motors 3 through the transmission signal line. In this embodiment, the communication port 21 is in series connection with seven motors 3, which are respectively labeled with motor number "1", "3", "6", "3", "3", "7", and "5".

Figure 4C:
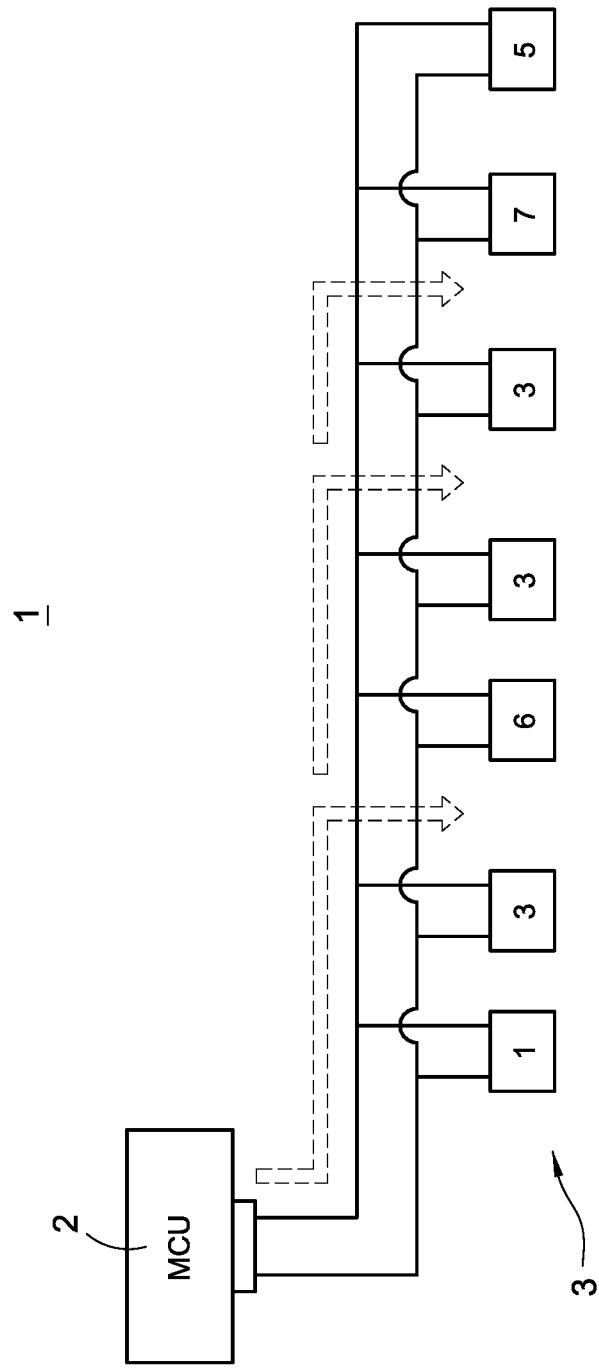
FIG. 4C is a schematic diagram showing a third setting action according to the first embodiment of the present invention.

As shown in FIG. 4C, after determining, the MCU 2 may know that there're three motors 3 having an identical motor number "3", so the MCU 2 may regard these three motors 3 as adjusting motors, and transmits the random numbering command to these three adjusting motors.

Figure 4D:
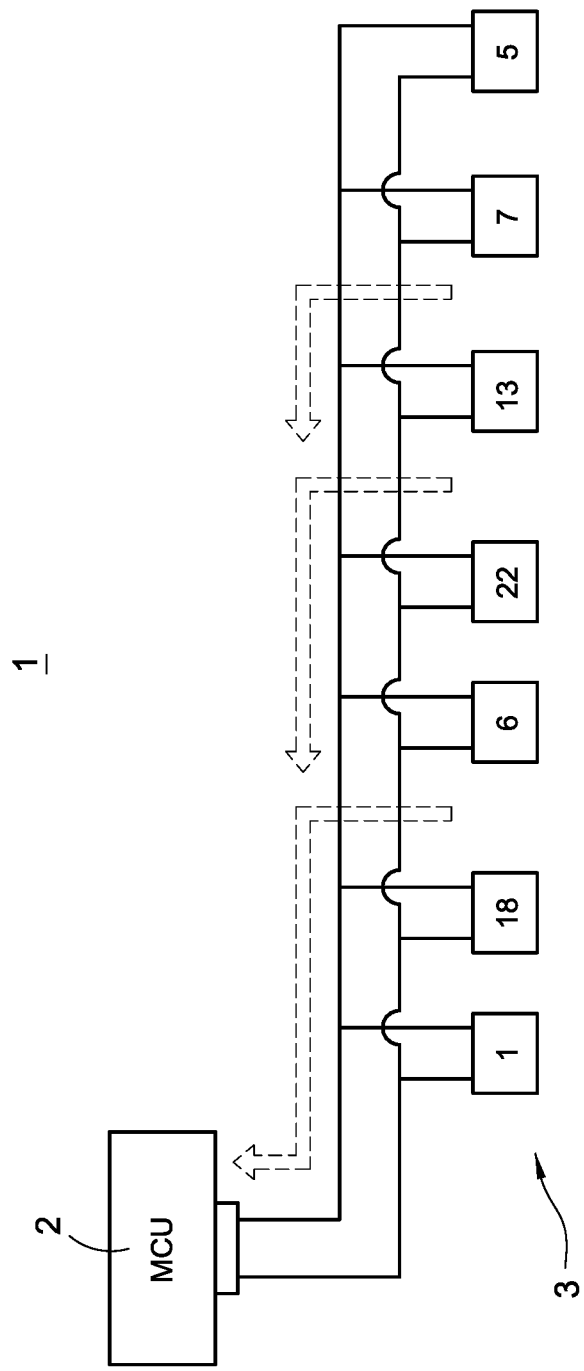
FIG. 4D is a schematic diagram showing a fourth setting action according to the first embodiment of the present invention.

Next, as shown in FIG. 4D, after receiving the random numbering command, the three adjusting motors may respectively perform the aforementioned random numbering procedure for generating the new motor number (in the embodiment of FIG. 4D, the new motor numbers of these three adjusting motors are "18", "22", and "13").

In one embodiment, these three adjusting motors may respectively and actively reply to the MCU 2 with the new motor number after the new motor number is generated. In another embodiment, these three adjusting motors may not actively reply to the MCU 2 with the new motor number, instead, the MCU 2 may re-scan the communication port 21 for re-obtaining the motor numbers (including the new motor numbers) of all the motors 3 (including the three adjusting motors) connected with the communication port 21.

FIG. 5 is a time-sequence diagram according to the first embodiment of the present invention. Before performing the aforementioned checking and setting procedure, the MCU 2 may obtain the motor amount of the multiple motors 3 in series connection with the communication port 21 (the embodiment of FIG. 5 uses five motors as an example) based on default data or user input. Besides, the MCU 2 may perform the checking and setting procedure according to the following order:

In step S30, the MCU 2 inquires the motor number of each motor 3 through scanning the communication port 21. In this embodiment, all the motors 3 are initially having an identical motor number "1".

In step S32, each of the motors 3 may respectively reply to the MCU 2 with its motor number (which is "1"), and the MCU 2 may know that an amount of different motor numbers (there's only one motor number) is different from the motor amount (there're five motors 3).

In step S34, the MCU 2 sends the random numbering command to all adjusting motors of the multiple motors 3. In this embodiment, all of the five motors 3 are having the identical motor number, so all of the five motors 3 are regarded by the MCU 2 as the adjusting motor, and the five adjusting motors may all receive the random numbering command.

In step S36, each adjusting motor is receiving the random numbering command sent from the MCU 2, and performs the random numbering procedure according to the content of the received random numbering command, so as to generate a new motor number respectively. In this embodiment, the five adjusting motors are respectively generating new motor numbers "2", "7", "1", "2", and "10".

In step S38, the MCU 2 may respectively receive the new motor number from each of the adjusting motors. In particular, the step S38 is for each of the adjusting motors to actively reply to the MCU 2 with the new motor number, or for the MCU 2 to again scan the communication port 21 for obtaining the new motor number from each of the adjusting motors, not limited thereto. After obtaining the new motor numbers of the adjusting motors, the MCU 2 may know that the amount of different motor numbers (there're four different motor numbers) is still different from the motor amount (there're five motors 3).

In step S40, the MCU 2 may re-send the random numbering command to the adjusting motors. In this time point, only two of the five motors 3 are having an identical motor number (which is number "2"), hence, only these two motors will be regarded by the MCU 2 as the adjusting motors.

In step S42, each of the adjusting motors may respectively receive the random numbering command sent from the MCU 2, and performs the random numbering procedure according to the content of the random numbering command, so as to again generate a new motor number. In this embodiment, the two adjusting motors are respectively generating new motor numbers "15" and "19".

In step S44, the MCU 2 may respectively receive the new motor number from the two adjusting motors. Similarly, the step S44 is for each of the adjusting motors to actively reply to the MCU 2 with the new motor number, or for the MCU 2 to again scan the communication port 21 for obtaining the motor number of all of the motors 3, not limited thereto.

After the step S44, the MCU 2 may determine that the amount of different motor numbers (there're five different motor numbers now) equals the motor amount (there're five motors 3), so the MCU 2 may start to interact with each of the motors 3 from step S46 (for example, starts to transmit control commands to each motor 3).

Via utilizing the setting method of the present invention, the user may set different motor numbers for different motors 3 inside the electronic device 1 without dismounting the electronic device 1, which makes the MCU 2 to convey commands easier and more accurate.

It should be noted that the MCU 2 in the embodiment is to obtain the motor number of each motor 3 through scanning the communication port 21, and the communication port 21 only includes one single transmission signal line. In order to ensure that no communication conflict will occur between the MCU 2 and the multiple motors 3, the present invention further discloses a signal reply confirmation mechanism (detailed descussed in the following). In another embodiment, the MCU 2 may have multiple communication ports 21 and multiple transmission signal lines, and the signal reply confirmation mechanism may be omitted in such scenario.

Figure 6:
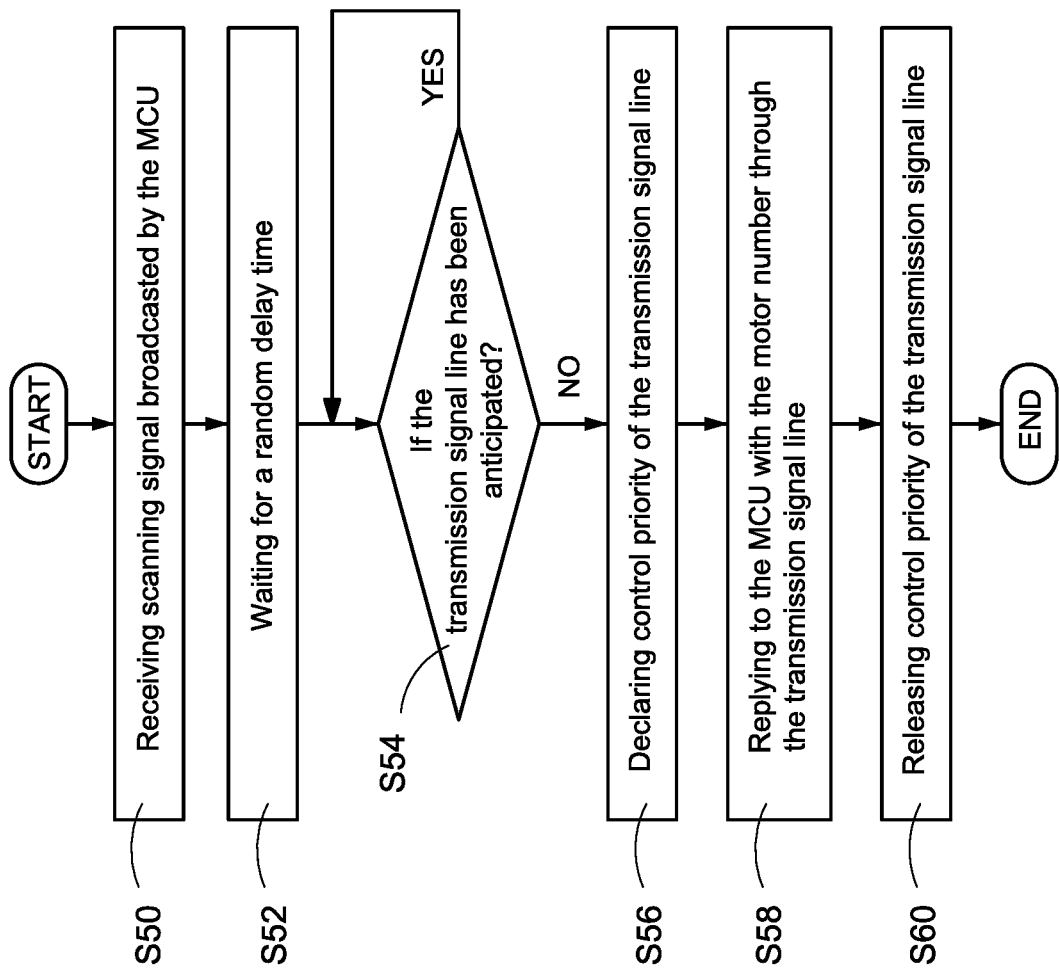
FIG. 6 is a signal transmitting flowchart according to the first embodiment of the present invention.

FIG. 6 is a signal transmitting flowchart according to the first embodiment of the present invention. For the sake of discussion, only one motor 3 of the electronic device 1 will be taken as an example in the following description.

In particular, after the MCU 2 scans the communication port 21 (i.e., executing the step S12 of FIG. 3), the motor 3 may receive the scanning signal from the receiving signal line of the communication port 21 that was externally broadcasted by the MCU 2 (step S50). Next, the motor 3 waits for a random delay time (step S52), such as 20 ms or less, not limited. However, the step S52 may be omitted.

Before replying to the MCU 2 with its motor number, the motor 3 first determines if the transmission signal line has been anticipated (step S54), i.e., the motor 3 determines whether a control priority of the transmission signal line has been declared (for example, has been declared by other motor 3 connected with the communication port 21). In this embodiment, the motor 3 determines that the transmission signal line is anticipated when the transmission signal line is set at low level, and determines that the transmission signal line is non-anticipated when the transmission signal line is set at high level. However, in another embodiment, the motor 3 may also determine that the transmission signal line is anticipated when the transmission signal line is set at high level, and determines that the transmission signal line is non-anticipated when the transmission signal line is set at low level, not limited thereto.

If the motor 3 determines that the transmission signal line is anticipated at the step S54, it then re-executes the step S54 for again determining whether the transmission signal line is usable.

If the motor 3 determines that the transmission signal line is non-anticipated at the step S54, the motor 3 then declares the control priority of the transmission signal line (step S56), so as to ensure that the transmission signal line will not be used by other motors 3 in at least a short period of time.

Next, the motor 3 replies to the MCU 2 with its motor number (or its new motor number) through the transmission signal line (step S58). After the motor number (or the new motor number) is replied, the control priority of the transmission signal line is released by the motor 3 (step S60). In the embodiment, the motor 3 sets the non-anticipated transmission signal line at low level to declare the control priority of the transmission signal line, and sets the anticipated transmission signal line at high level to release the control priority of the transmission signal line. However, in other embodiment the motor 3 may also set the non-anticipated transmission signal line at high level to declare the control priority of the transmission signal line, and sets the anticipated transmission signal line at low level to release the control priority of the transmission signal line, not limited thereto.

In the present invention, all the motors 3 in series connection with the communication port 21 are simultaneously executes each step shown in FIG. 6 for fighting for the control priority of the transmission signal line, so as to reply to the MCU 2 with their own motor number (or new motor number) through the transmission signal line. Therefore, the electronic device 1 of the present invention will not lose any signal because of communication conflict.

As the skilled person will appreciate, various changes and modifications can be made to the described embodiment. It is intended to include all such variations, modifications and equivalents which fall within the scope of the present invention, as defined in the accompanying claims.

What is claimed is:

1. A motor number setting method for electronic device, the electronic device having an MCU and multiple motors in series connection with a communication port of the MCU, and the motor number setting method comprising following steps:
    a) obtaining a motor amount of the multiple motors connected with the communication port by the MCU, wherein each of the motors is a servo motor having a microprocessor, firmware of the microprocessor has been pre-embedded with programing code related to a random numbering procedure;
    b) scanning the communication port by the MCU for respectively obtaining a motor number of all motors which are in series connection with the communication port;
    c) determining whether an amount of different motor numbers is equal to the motor amount by the MCU;
    d) sending a random numbering command to a plurality of adjusting motors of the multiple motors that have an identical motor number by the MCU when determining that the amount of different motor numbers is different from the motor amount;
    e) performing the random numbering procedure according to the random numbering command for generating a new motor number by the microprocessor of each of the adjusting motors respectively; and
    f) re-executing the step b) to the step e) before determining that the amount of different motor numbers is equal to the motor amount by the MCU.

2. The motor number setting method in claim 1, wherein in the step d), the MCU is to confirm an amount of the motors that are involved in each identical motor number when determining that the amount of different motor numbers is smaller than the motor amount, and to regard the plurality of motors having the identical motor number as the adjusting motors.

3. The motor number setting method in claim 2, wherein in the step d), the MCU is to confirm the amount of the motors that are involved in each identical motor number based on a return delay mechanism.

4. The motor number setting method in claim 1, wherein the random numbering command comprises a numbering condition, and the microprocessor of each of the adjusting motors in the step e) is to perform the random numbering procedure for generating the new motor number that meets the numbering condition.

5. The motor number setting method in claim 1, wherein the microprocessor of each of the adjusting motors in the step e) is to perform the random numbering procedure for generating the new motor number according to at least one of a serial number, an output of a timer, and an accumulated execution time.

6. The motor number setting method in claim 1, wherein each of the multiple motors is respectively connected with the communication port through a transmission signal line (Tx) and a receiving signal line (Rx), and each motor respectively broadcasts the motor number to the MCU through the transmission signal line (Tx) of the communication port, and each adjusting motor respectively broadcasts the new motor number to the MCU through the transmission signal line (Tx).

7. The motor number setting method in claim 6, wherein each of the motors respectively executes following steps in the step b):
    b1) receiving a scanning signal through the receiving signal line (Rx) of the communication port broadcasted by the MCU;
    b2) determining whether a control priority of the transmission signal line has been declared by another motor;
    b3) re-executing the step b2) when determining that the control priority of the transmission signal line has been declared by another motor;
    b4) declaring the control priority of the transmission signal line when determining that the control priority of the transmission signal line has not been declared by another motor;
    b5) replying to the MCU with the motor number through the transmission signal line; and
    b6) releasing the control priority of the transmission signal line.

8. The motor number setting method in claim 7, wherein each of the motors determines that the control priority of the transmission signal line has been declared when the transmission signal line is set at low level, determines that the control priority of the transmission signal line has not been declared when the transmission signal line is set at high level, declares the control priority of the transmission signal line by setting the transmission signal line at low level, and releases the control priority of the transmission signal line by setting the transmission signal line at high level.

9. An electronic device having multiple motors in series connection, comprising:
- multiple motors, each of the motors respectively having a motor number, and each of the motors is a servo motor having a microprocessor, firmware of the microprocessor has been pre-embedded with programing code related to a random numbering procedure;
- an MCU, configured to record a motor amount of the multiple motors and connected with the multiple motors in series connection through a communication port, and configured to scan the communication port for respectively obtaining the motor number of all motors which are in series connection with the communication port;
- wherein, the MCU is configured to determine whether an amount of different motor numbers is equal to the motor amount, and configured to send a random numbering command to a plurality of adjusting motors of the multiple motors that have an identical motor number when determining that the amount of different motor numbers is different from the motor amount;
- wherein, the microprocessor of each of the adjusting motors is respectively configured to perform the random numbering procedure for generating a new motor number according to the random numbering command;
- wherein, the MCU is configured to re-scan the communication port and send the random numbering command before determining that the amount of different motor numbers is equal to the motor amount.

10. The electronic device in claim 9, wherein the MCU is configured to confirm an amount of the motors that are involved in each identical motor number when determining that the amount of different motor numbers is smaller than the motor amount, and regards a plurality of motors having the identical motor number as the adjusting motors.

11. The electronic device in claim 9, wherein the random numbering command comprises a numbering condition, and the microprocessor of each of the adjusting motors is respectively configured to perform the random numbering procedure for generating the new motor number that meets the numbering condition.

12. The electronic device in claim 9, wherein the microprocessor of each of the adjusting motors is respectively configured to perform the random numbering procedure for generating the new motor number according to at least one of a serial number, an output of a timer, and an accumulated execution time.

13. The electronic device in claim 9, wherein the communication port comprises a transmission signal line (Tx) and a receiving signal line (Rx) and is connected with each of the multiple motors through the transmission signal line (Tx) and the receiving signal line (Rx), each of the motors is respectively configured to broadcast the motor number to the MCU through the transmission signal line, each of the adjusting motors is respectively configured to broadcast the new motor number to the MCU through the transmission signal line, and the MCU is configured to broadcast externally a scanning signal for each of the multiple motors to receive through the receiving signal line for scanning the communication port.

14. The electronic device in claim 13, wherein one of the multiple motors is configured to determine whether a control priority of the transmission signal line has been declared by another motor after receiving the scanning signal through the receiving signal line, to re-determine whether the control priority of the transmission signal line has been declared by another motor or not when determining that the control priority of the transmission signal line has been declared by another motor, to declare the control priority of the transmission signal line when determining that the control priority of the transmission signal line has not been declared by another motor, and then releases the control priority of the transmission signal line after replying to the MCU with the motor number through the transmission signal line.

15. The electronic device in claim 9, the electronic device is a robot.

* * * * *